United States Patent
Honary et al.

(10) Patent No.: US 8,144,608 B2
(45) Date of Patent: Mar. 27, 2012

(54) METHOD AND SYSTEM FOR MEDIUM ACCESS CONTROL (MAC) RATE SELECTION

(75) Inventors: Hooman Honary, Newport Beach, CA (US); Jeyhan Karaoguz, Irvine, CA (US); Nambirajan Seshadri, Irvine, CA (US); Jason Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 694 days.

(21) Appl. No.: 11/683,187

(22) Filed: Mar. 7, 2007

(65) Prior Publication Data

US 2008/0175163 A1 Jul. 24, 2008

Related U.S. Application Data (60) Provisional application No. 60/885,964, filed on Jan. 22, 2007.

(51) Int. Cl.
*H04L 12/26* (2006.01)
(52) U.S. Cl. .......... 370/252; 370/338; 370/344
(58) Field of Classification Search .......... 370/252, 370/338, 344
See application file for complete search history.

(56) References Cited

U.S. PATENT DOCUMENTS

| | | | |
|---|---|---|---|
| 6,944,125 B1 * | 9/2005 | Salmanian | 370/232 |
| 7,099,283 B2 * | 8/2006 | Matta et al. | 370/252 |
| 7,583,645 B2 * | 9/2009 | Qi et al. | 370/338 |
| 2003/0142651 A1 * | 7/2003 | Matta et al. | 370/338 |
| 2005/0160181 A1 | 7/2005 | Kwon et al. | |
| 2006/0045117 A1 | 3/2006 | Qi et al. | |
| 2006/0128318 A1 * | 6/2006 | Agarossi et al. | 455/69 |

FOREIGN PATENT DOCUMENTS

| | | |
|---|---|---|
| WO | WO0108369 A1 | 2/2001 |
| WO | WO20060055718 A2 | 5/2006 |
| WO | WO 2006091391 | 8/2006 |
| WO | WO20060104596 A2 | 10/2006 |

OTHER PUBLICATIONS

EPO Communication dated May 18, 2011 in Application No. 07022242.7-2412 / 1947884, 6 pages.

* cited by examiner

*Primary Examiner* — Phuc Tran
(74) *Attorney, Agent, or Firm* — Garlick & Markison; Bruce E. Garlick (57) ABSTRACT

Aspects of a method and system for medium access control (MAC) rate selection are presented. Aspects of the system may include at least one processor that enables selection of MAC layer parameter values and/or PHY layer parameter values, to maintain a rate of data transmission of at least one transmitted signal, which is no greater than a selected data transfer rate. The error rate of the one or more transmitted signals may be maintained within a specified range based on the selection for varying signal to noise (SNR) ratios.

24 Claims, 6 Drawing Sheets

METHOD AND SYSTEM FOR MEDIUM ACCESS CONTROL (MAC) RATE SELECTION

CROSS-REFERENCE TO RELATED APPLICATIONS/INCORPORATION BY REFERENCE

This application makes reference to, claims priority to, and claims the benefit of U.S. Provisional Application Ser. No. 60/885,964 filed Jan. 22, 2007, which is incorporated herein by reference in its entirety.

This application makes reference to U.S. application Ser. No. 11/327,690 filed Jan. 6, 2006, which is hereby incorporated herein by reference in its entirety.

FIELD OF THE INVENTION

Certain embodiments of the invention relate to multimedia communications. More specifically, certain embodiments of the invention relate to a method and system for medium access control (MAC) rate selection.

BACKGROUND OF THE INVENTION

In a communication network, data may be transmitted, via a network, between a transmitting terminal and a receiving terminal. The network may comprise a plurality of communications media and communications devices that facilitate the transfer of data, in the form of messages, packets or frames, between a transmitting terminal and a receiving terminal. Various protocols may be utilized to transmit the data. Some transport layer data protocols may control the quantity of data that may be transmitted during a time interval, as measured in bits per second (bps), for example. The transmission control protocol (TCP) may be considered to be an example of one such protocol. TCP may limit the amount of data that is transmitted during a time interval based on a congestion window and/or a slow start algorithm. At the beginning of transmission of a data flow, the congestion window size may be set to an initial value. This may result in a relatively small amount of data being transmitted from a transmitting terminal to a receiving terminal. The receiving terminal may subsequently communicate an acknowledgement upon receipt of the data that was transmitted by the transmitting terminal.

Upon receipt of the acknowledgement, the transmitting terminal may increase the value associated with the congestion window to a number larger than the initial window size, and transmit subsequent data based on the larger window size of the congestion window. This may result in a larger amount of data being transmitted than during a comparable time interval in which the value associated with the congestion window is smaller. A larger congestion window may also result in a higher data transfer rate between the transmitting terminal and the receiving terminal. The receiving terminal may communicate subsequent acknowledgements upon receipt of subsequent information. The transmitting terminal may continue to increase the size of the congestion window upon receipt of a subsequent acknowledgement.

In instances when the transmitting terminal does not receive a corresponding acknowledgement, the transmitting terminal may retransmit, or resend, previously transmitted data. In addition, the transmitting terminal may determine that congestion may exist in the network resulting in the previously transmitted data not being received by the receiving terminal. The previously transmitted data may be considered by the transmitting terminal to be "lost". A bit error rate (BER), packet error rate (PER), or frame error rate (FER), may be used as a measure of the lost data. An increase in the BER, PER, and/or FER may result in an increase in the quantity of transmitted data that is lost.

In response to a determination of lost data, the transmitting terminal may also reduce the size of the congestion window. The reduction in the size of the congestion window may result in a corresponding reduction in the data transfer rate between the transmitting terminal and the receiving terminal. Once reduced, the size of the congestion window may be subsequently increased.

A mechanism by which the congestion window size may be utilized to limit the amount of data that may be transmitted during a time interval is a sliding window protocol. In a sliding window protocol, the transmitted data may be sequence numbered. For a given current congestion window size, $CW_{Curr}$, the transmitting terminal may transmit a number of data blocks, for example packets of data, where the sequence number, SEQ, is within the range $SEQ_{UnAck} \leq SEQ \leq SEQ_{UnAck} + CW_{Curr}$, where $SEQ_{UnAck}$ is a sequence number for an unacknowledged transmitted data block. When the sequence number for a structure is $SEQ > SEQ_{UnAck} + CW_{Curr}$, the transmitting terminal may delay transmitting the data until one or more previously transmitted blocks or portions of the data have been acknowledged, such that the condition $SEQ \leq SEQ_{UnAck} + CW_{Curr}$ is met. During a slow start, the current congestion window size may be such that the transmitting terminal may transmit a single data block and wait for the transmitted data block to be acknowledged before transmitting subsequent data blocks. A procedure in which a transmitting station may transmit a single data block and wait for the transmitted data block to be acknowledged before transmitting a subsequent data block may be referred to as a stop and wait protocol.

Some data link layer data protocols may also control a data transfer rate. The MAC layer, as specified in resolution 802.11n from the Institute of Electrical and Electronics Engineers (IEEE), may be considered to be an example of one such protocol. The MAC layer may utilize a stop and wait protocol. The MAC layer parameters may influence the data transfer rate. For example, a contention window parameter may be utilized to determine a number of frame retransmission attempts that may occur if the transmitting terminal does not receive an acknowledgement from the receiving terminal in response to a first transmission attempt. A subsequent frame may not be transmitted until the current frame has been acknowledged or until a maximum number of retransmission attempts based on the contention window parameter have been performed. In some multiple input multiple output (MIMO) wireless communication systems, such as specified in resolution 802.11n from the Institute of Electrical and Electronics Engineers (IEEE), an exemplary MAC layer parameter may be determined base on an antenna selection procedure, in which each of a number of $NSS \geq 1$ transmitted data streams (where NSS may refer to the number of data streams) may be transmitted via a selected one or more transmitting antennas among a plurality of NTX>1 transmitting antennas (where NTX may refer to the number of transmitting antennas).

The BER, PER, and/or FER may be influenced by values for one or more physical (PHY) layer parameters utilized by the transmitting station. Examples of PHY layer parameters may comprise a coding rate utilized for binary convolutional coding (BCC), and a modulation type such as 64-level quadrature amplitude modulation (64-QAM).

When a coding rate is decreased from 5/6 to 3/4, for example, the data transfer rate may decrease while the BER, PER, and/or FER may also decrease. When the coding rate is increased from 1/2 to 3/4, for example, the data transfer rate may increase while the BER, PER, and/or FER may also increase. When the modulation type utilized is changed from 64-QAM to 256-QAM, the data transfer rate may increase while the BER, PER, and/or FER may also increase. When the modulation type is changed from 64-QAM to binary phase shift keying (BPSK), the data transfer rate may decrease while the BER, PER, and/or FER may also decrease. In some MIMO systems for which NSS=NTX, the data rate may decrease when NSS<NTX while the BER, PER, and/or FER may also decrease. When NSS<NTX, one or more data streams may be redundantly transmitted via more than one transmitting antenna.

A maximum data transfer rate for a terminal may be determined based on limitations imposed by the communication medium through which the transmitted data is sent. The maximum data transfer rated supported by the communication medium may be referred to as "wire speed."

For some applications, which utilized the transmitting terminal to transmit data via the network, the peak data rate required may be less than wire speed. Consequently, it may not be necessary to utilize PHY layer parameters to achieve a maximum data rate for the transmitting terminal. Furthermore, for such applications that transmit data under real time constraints, such as streaming video, voice over Internet protocol (VOIP), retransmission of data may be undesirable due to latency delays associated with the retransmissions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for medium access control (MAC) rate selection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for medium access control (MAC) rate selection. Aspects of a system for handling multimedia information in a communication system may comprise a transmitter that enables control of a MAC layer and/or a PHY layer, in a wireless communication device, to select MAC layer and/or PHY layer parameter values. MAC layer and/or PHY layer parameter values may be selected to enable a transmitting terminal to transmit data at a selected data transfer rate while achieving error rate performance within a specified range. The error rate performance may be measured based on a bit error rate (BER), packet error rate (PER), and/or frame error rate (FER), for example. In various embodiments of the invention, the setting PHY layer and/or MAC layer parameter values to minimize BER and/or FER at the PHY layer and/or MAC layer may reduce the likelihood of TCP slow start events.

Figure 1:
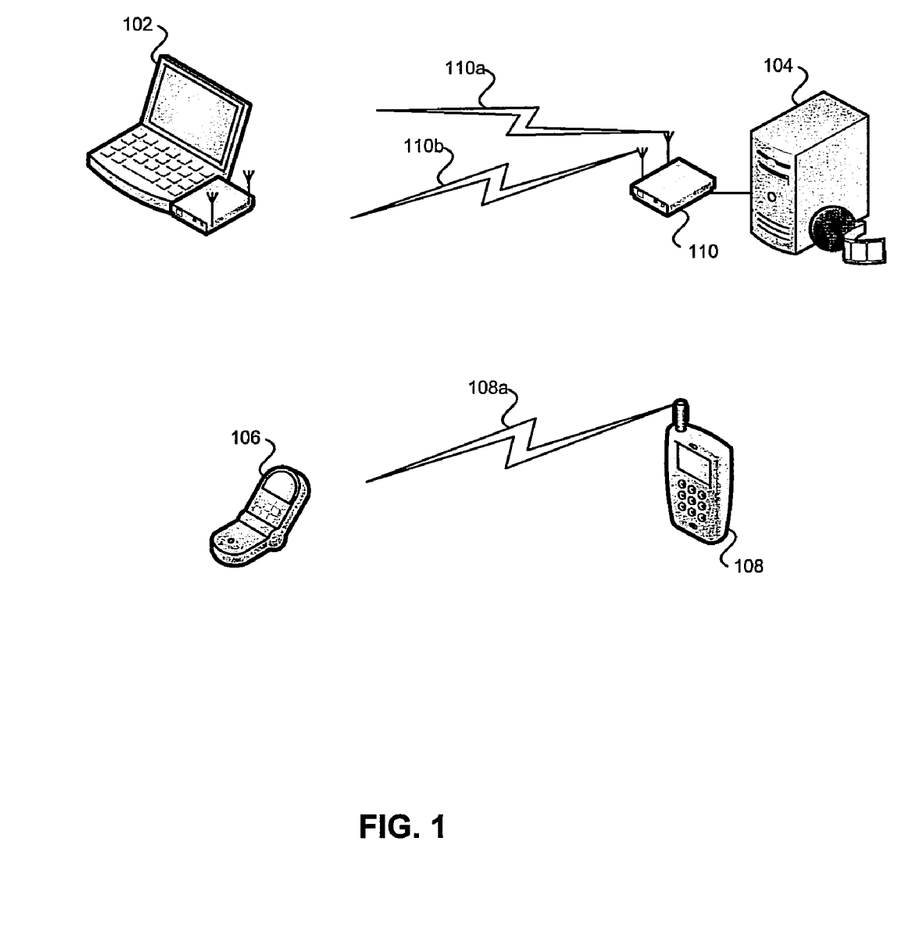
FIG. 1 is an illustration of an exemplary system for wireless communications, which may be utilized in connection with an embodiment of the invention.

FIG. 1 is an illustration of an exemplary system for wireless communications, which may be utilized in connection with an embodiment of the invention. Referring to FIG. 1, there is shown a mobile computing system 102, a streaming media server 104, a mobile telephone 106, a Smartphone 108, and a multiple input multiple output (MIMO) communication system 110. The MIMO communications system 110 may be utilized to transmit and/or receive one or more signals 110a and 110b.

The mobile computing system 102 may comprise a MIMO communication system, which enables the mobile computing system 102 to simultaneously transmit data via one or more transmitted signals, and/or to simultaneously receive data via one or more received signals. The mobile computing system 102 may utilize a wireless communication medium. The mobile computing system 102 may be utilized by a user to execute programs and/or applications, for example, email, world wide web (WWW) browsers, database access programs, voice of Internet protocol (VOIP), and/or media recorders and players.

The streaming media server 104 may store one or more video programs, audio programs, multimedia programs, and/or data. The streaming media server 104 may be communicatively coupled to a MIMO communication system 110, which enables the streaming media server to simultaneously transmit data and/or multimedia streams via one or more transmitted signals 110a and 110b, and/or to simultaneously receive data and/or multimedia streams via one or more received signals 110 and 110b.

The mobile telephone 106 may be utilized to transmit and/or receive voice, data, and/or multimedia communications, via wireless communication medium. In addition, the mobile telephone may be utilized to transmit and/or receive text messages, and/or to perform WWW browsing.

The Smartphone 108 may be utilized to perform functions similar to those described for the mobile telephone 106. The Smartphone 108 may be utilized to transmit or receive a signal 108a. In addition, the Smartphone 108 may be utilized to perform handheld computer functions such as in a personal digital assistant (PDA). Exemplary PDA functions performed by a Smartphone 108 may comprise managing name and address databases, personal calendars and to-do lists, and note taking.

The signals 110a, 110b, and/or 108a may be transmitted via a shared wireless communication medium. The signal 110a may be subject to interference from signals 110b, and 108b. Furthermore, the signal 110b may be subject to interference from signals 110a, and 108b. Similarly, the signal 108a may be subject to interference from signals 110a, and 110b. A transmitting MIMO communication system 110 may utilize beamforming to enable cancelling of interference between the signals 110a and 110b at a MIMO receiver. The signals 110a and 110b may be transmitted via a different frequency band from the signal 108a to avoid interference. However, when a plurality of transmitting MIMO systems 110 attempt to simultaneously transmit signals via a common frequency or frequency range, there may be interference between the transmitted signals. Such an episode of interference may be referred to as a collision. A collision may be detected at the MAC layer within the MIMO communication system 110. Data transmitted via MAC frames, for example, may be modified, or corrupted, during a collision. The MAC layer may implement strategies, for example retry attempts based on a congestion window parameter, in response to a collision.

Even in the absence of interference and/or collisions, data transmitted via the signals 110a, 110b, and/or 110c may be corrupted during transmission due to nonlinear characteristics of the wireless communications medium. Such nonlinearities may be referred to as channel fading. In a flat fading channel, the nonlinear characteristics of the wireless communication medium may be substantially similar across a range of frequencies. In a selective fading channel, the nonlinear characteristics of the wireless communication medium may vary across the range of frequencies. Fading may result in bit errors in the transmitted data, as detected at a receiving terminal, for example the mobile computing system 102. The rate at which bit errors occur may be measured by a bit error rate (BER) statistic. Bit errors in received data may result in frame errors and/or packet errors detected at the receiving terminal. The rate at which frame errors occur may be measured by a frame error rate (FER) statistic. The rate at which packet errors occur may be measured by a packet error rate (PER) statistic.

A transmitting terminal, for example the MIMO communication system 110, and/or streaming media server 104, may detect the occurrence of bit errors, frame errors, and/or packet errors when the transmitting terminal does not receive an acknowledgement corresponding to a previously transmitted frame and/or packet. The transmitting terminal may compute a FER and/or PER based on the number of frames and/or packets transmitted, versus the number of frames and/or packets for which corresponding acknowledgements were received. The transmitting terminal may also compute a data transfer rate, as measured by bits per second (bps) for example, based on the number of bits transmitted during a given time interval.

In various embodiments of the invention, a user may select a data transfer rate, which is to be utilized for transmitting voice, multimedia, and/or data from a transmitting terminal. Based on the application being utilized, a target BER, FER, and/or PER range may be determined. The target range may comprise a range of acceptable error rates for the application. The transmitting terminal may transmit signals based on an initial set of PHY layer parameter values, and/or MAC layer parameter values. Exemplary PHY layer parameter may comprise coding rates, modulation and modulation types. Exemplary MAC layer parameters may comprise contention window sizes.

The transmitting terminal may then compute BER, FER, and/or PER based on transmitted data. The computed BER, FER, and/or PER values may be compared to corresponding target BER, FER, and/or PER values. When the computed BER, FER, and/or PER values are within the corresponding target ranges, the transmitting terminal may maintain current PHY layer parameters and/or MAC layer parameters. When the computed BER, FER, and/or PER values are not within the corresponding target ranges, the transmitting terminal may select one or more new PHY layer parameter values, and/or MAC layer parameter values.

Various embodiments of the invention may be practiced in open loop systems, in which the transmitting terminal computes BER, FER, and/or PER values based on transmitted data, and selects PHY layer parameters and/or MAC layer parameters based on the computed values. Various embodiments of the invention may also be practiced in closed loop system, in which the transmitting terminal receives feedback information from the receiving terminal. A closed loop system may be utilized in connection with an antenna selection procedure, for example. The antenna selection procedure may enable selection of transmitting antennas to be utilized for transmitting selected data streams where the number of transmitting antennas is greater than the number of transmitted data streams, NTX>NSS, for example.

Figure 2A:
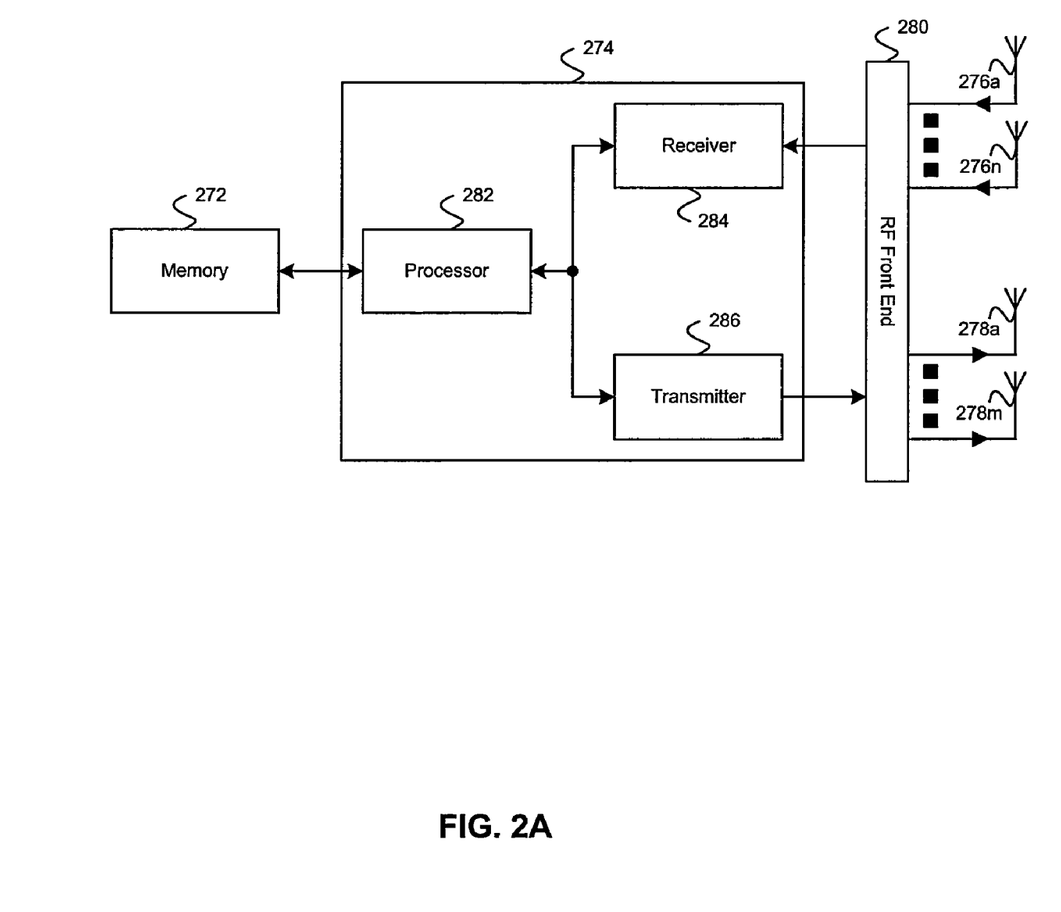
FIG. 2A is a block diagram of exemplary transceiver circuitry, which may be utilized in connection with an embodiment of the invention.

FIG. 2A is a block diagram of exemplary transceiver circuitry, which may be utilized in connection with an embodiment of the invention. With reference to FIG. 2A, there is shown a memory processor 272, a transceiver 274, an RF front end 280, one or more receive antennas 276a, ..., 276n, and one or more transmitting antennas 278a, ..., 278m. The transceiver 274 may comprise a processor 282, a receiver 284, and a transmitter 286.

The memory 272 may enable storage and/or retrieval of data that may be transmitted via one or more transmitting antennas 278a, ..., 278m, received via one or more receive antennas 276a, ..., 276n, and/or storage of code that may enable control of the operation of the transceiver 274. In a MIMO system, the number of transmitting antennas 278a, ..., 278m, may be determined based on the parameter NTX. In the MIMO system, the number of receiving antennas 276a, ..., 276n, may be determined based on a parameter NRX. Each value NTX and NRX may be a number, for example an integer.

The processor 282 may enable digital receiver and/or transmitter functions in accordance with applicable communications standards. These functions may comprise, but are not limited to, tasks performed at lower layers in a relevant protocol reference model. These lower layers may comprise the PHY layer and/or the MAC layer. These tasks may further comprise the physical layer convergence procedure (PLCP), physical medium dependent (PMD) functions, and associated layer management functions.

The receiver 284 may enable digital receiver functions that may comprise, but are not limited to, fast Fourier transform processing, equalization, demapping, demodulation control, deinterleaving, depuncture, and decoding. The transmitter 286 may enable digital transmitter functions that comprise, but are not limited to, coding, puncture, interleaving, mapping, modulation control, and inverse fast Fourier transform processing. In a MIMO system, the transmitter 286 may enable beamforming processing. The RF front end 280 may enable reception of analog RF signals via the one or more antennas 276a, ..., 276n, converting the RF signal to baseband, and generating digital representations of the received analog baseband signals. The digital representation may be a complex quantity comprising I and Q components. The RF front end 280 may also transmit analog RF signals via the one or more antennas 278a, ..., 278m, where a digital baseband signal may be converted to an analog RF signal prior to transmission.

In operation, the processor 282 may receive data from the receiver 284. The processor 282 may store received data to the memory 272 for subsequent analysis and/or processing. The processor 282 may retrieve data from the memory 272. The retrieved data may be transmitted via an RF channel by the transmitter 286. The processor 282 may select values for one or more MAC layer and/or PHY layer parameters for transmitting the data. In various embodiments of the invention, values for the one or more MAC layer and/or PHY layer parameters may be selected based on a selected data transfer rate and a target value range for BER, FER, and/or PER.

Figure 2B:
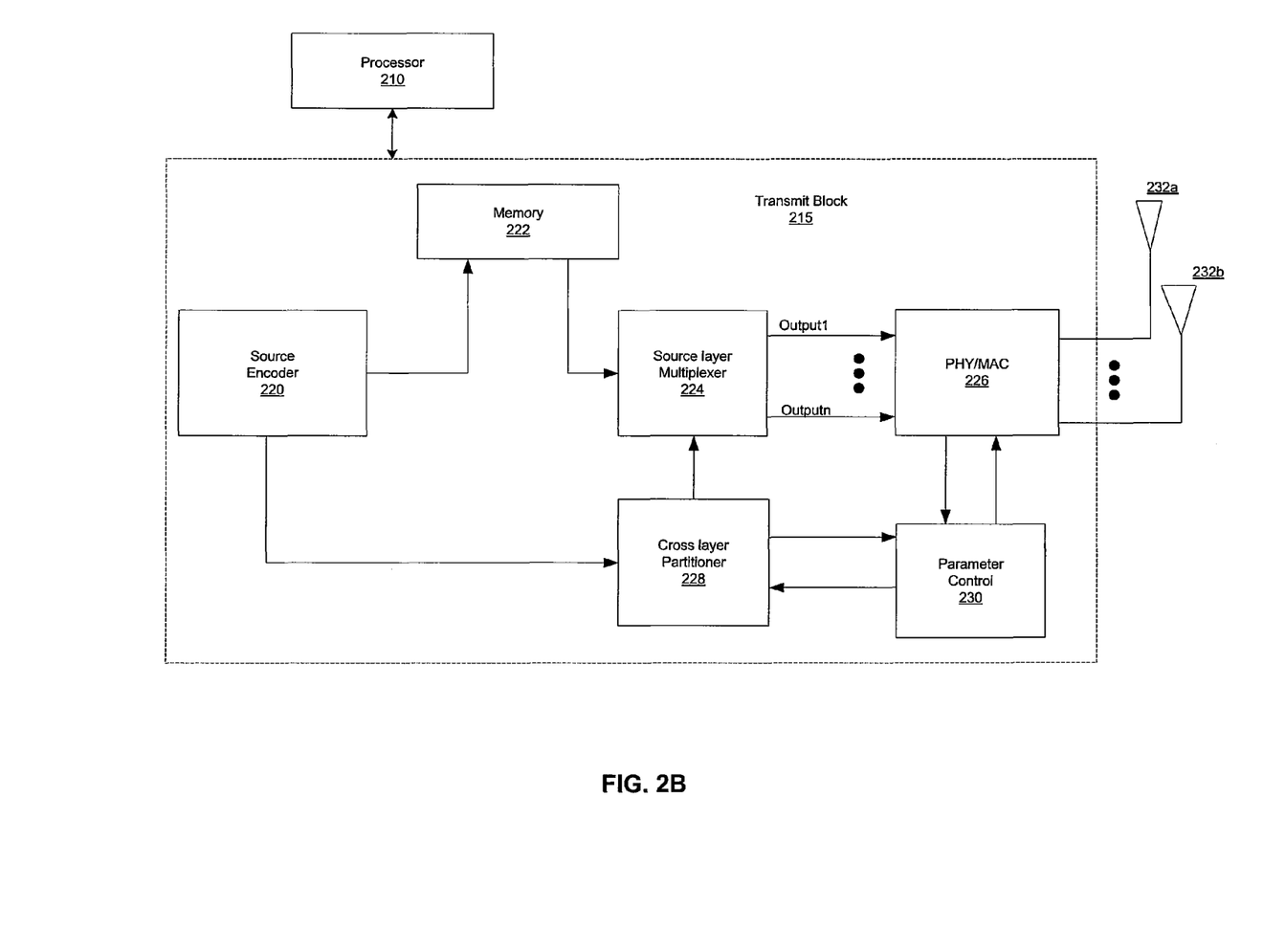
FIG. 2B illustrates an exemplary architecture for MAC layer rate selection, in accordance with an embodiment of the invention.

FIG. 2B illustrates an exemplary architecture for MAC layer rate selection, in accordance with an embodiment of the invention. Referring to FIG. 2B, there is shown a processor 210 and a transmit block 215. The transmit block 215 may comprise a source encoder block 220, a memory block 222, a source layer multiplexer block 224, a PHY/MAC block 226, a cross-layer partitioner block 228, a parameter control block 230, and transmit antennas 232a, ..., 232b.

The source encoder block 220 may comprise suitable logic, circuitry, and/or code that may enable compression of data prior to transmission. For example, the compressed data may be video data in MPEG-4 format. The source encoder block 220 may also communicate information about the compressed data to the cross-layer partitioner block 228. The information communicated may relate to the type of compression. For example, if the compressed data comprises video data, the source encoder block 220 may communicate the specific type of compression, such as MPEG-1, MPEG-2, MPEG-4, H.261, H.263, or H.264. The source encoder block 220 may also communicate the type of chroma subsampling used, such as, for example, 4-4-4, 4-2-2, or 4-2-0 chroma subsampling.

The source layer multiplexer block 224 may comprise suitable logic, circuitry, and/or code that may enable reading data from, for example, the memory block 222 and communicating various portions of the data to the PHY/MAC 226. In a MIMO communication system, the data may be split into a plurality of portions according to information from the cross-layer partitioner block 228. Each portion may correspond to a data stream to be transmitted, or spatial stream. The information from the cross-layer partitioner block 228 may, for example, be utilized to determine a value for the number of spatial streams, NSS.

The PHY/MAC block 226 may comprise suitable logic, circuitry, and/or code that may enable conversion of input data in a digital format to output suitably modulated analog data ready for transmission. For example, the PHY/MAC block 226 may apply a FEC code to the digital data. The PHY/MAC block 226 may also apply a specific RF modulation to the analog signal, which may have been converted from the digital data and transmitted via at least one transmitting antenna 232a, ..., 232b. In a MIMO communication system the PHY/MAC block 226 may be utilized to perform beamforming on transmitted spatial streams, and to assign each beamformed signal to at least one of the transmitting antennas 232a, ..., 232b.

In an embodiment of the invention, the PHY/MAC block 226 may receive one or more streams of digital data. The PHY/MAC block 226 may then operate on the one or more streams as indicated by, for example, the parameter control block 230. Accordingly, the PHY/MAC block 226 may, for example, apply a specific FEC code to each digital stream. In a MIMO system, a plurality of digital streams may be beamformed to generate a corresponding plurality of beamformed signals. Each digital stream, and/or beamformed signal, may then be converted to an analog RF signal, which may be modulated by a specific RF modulation scheme. Each modulated RF signal may then be communicated to one or more antennas to be transmitted.

The cross-layer partitioner block 228 may comprise suitable logic, circuitry, and/or code that may enable determination of the number of spatial streams, and partitioning of data retrieved from the memory block 222 into the NSS number of spatial streams. In a MIMO communication system, $NSS \geq 1$.

In a MIMO communication system, the cross-layer partitioner block 228 may also indicate to the source layer multiplexer block 224, which portions of data retrieved from the memory block 222 are to be assigned to each of a plurality of NSS>1 spatial streams. The source layer multiplexer block 224 may communicate the corresponding spatial streams to the PHY/MAC block 226. The cross-layer partitioner block 228 may then communicate to the parameter control block 230 PHY layer parameter values and/or MAC layer parameter values, which may be utilized with processing the spatial streams.

In a MIMO communication system, specific streams of data may be communicated to specific transmit antennas. The cross-layer partitioner block 228 may have information regarding the propagation path from each transmit antenna 232a, ..., 232b to a receive antenna, where data transmitted via one transmit antenna may be received with fewer bit errors, for example, than data transmitted by another transmit antenna. Accordingly, this information may be used to determine which combination data from one or more spatial streams may be transmitted via which transmit antenna. The combination of data from the one or more spatial streams may be referred to as beamforming. The information regarding the propagation path for each transmit antenna may be generated, for example, from feedback information from the receiving devices. Alternatively, the information may be generated from feedback information from a receiver co-located with the transmit block 215.

The parameter control block 230 may comprise suitable logic, circuitry, and/or code that may enable controlling of various operations to the digital data in the PHY/MAC block 226. For example, the parameter control block 230 may determine the FEC code and/or the RF modulation that may be used by the PHY/MAC block 226 for specific portions of data. The parameter control block 230 may also determine which antennas may be used to transmit which portions of data by controlling routing of the data within the PHY/MAC block 226 to the specific antennas.

In various embodiments of the invention, the parameter control block 230 may select parameter values utilized to control operations in the PHY/MAC block 226 based on a selected data transfer rate and a target value range for BER, FER, and/or PER. Based on BER, FER, and/or PER values computed by the PHY/MAC block 226 based on the transmitted signals, the parameter control block 230 may select values for, for example, coding rates, modulation types, and antenna selection. The selected values may be chosen such that the transmit block 215 may transmit voice, multimedia, and/or data at the selected data transfer rate while achieving a computed BER, FER, and/or PER that is within the corresponding target range for BER, FER, and/or PER. The selected values may be communicated to the PHY/MAC block 226, which may utilize the values for transmitting subsequent signals.

In various embodiments of the invention, a single coding rate, and a single modulation type may be selected. The selected coding rate and modulation type may be utilized for each of the NSS spatial streams. In various other embodiments of the invention, the coding rate and/or modulation type may be selected adaptively. In a system utilizing adaptive coding, a coding rate may be selected for each of the NSS spatial streams individually, where a coding rate utilized for one spatial stream may be different from a coding rate utilized for another spatial stream. In a system utilizing adaptive modulation, a modulation type utilized for one spatial stream may be different from a modulation type utilized for another spatial stream.

In operation, the source encoder block 220 may compress data and store the compressed data in the memory block 222. For simplicity, Output1 data and Outputn data may be transmitted by the transmit antennas 232a and 232b, respectively. The source encoder block 220 may communicate to the cross layer partitioner block 228 that the compressed data is video data using the MPEG-4 format. The source encoder block 220 may also communicate, for example, start and end memory addresses for the stored video data corresponding to a frame, the frame number, and the type of frame that may be stored. The type of frame may be, for example, I-frame, P-frame, and B-frame. Other information may also be communicated, such as, for example, the chroma sub-sampling format.

The cross layer partitioner block 228 may then determine a number of spatial streams, NSS, into which to portion the video data. Each portion of the video data may be assigned to one of the spatial streams. In a MIMO communication system, which utilizes transmitter diversity, the number of spatial streams may be less than the number of transmitting antennas, or NSS<NTX. The source layer multiplexer 224 may read data from the memory block 222, and may output, for example, data associated with spatial stream 1 via Output1, and data associated with spatial stream n via Outputn, where n may be a number equal to NSS.

The cross layer partitioner block 228 may also communicate to the parameter control block 230 the operations to be applied to each stream of data, namely, Output1 and Outputn. For example, the parameter control block 230 may select values for MAC layer and/or PHY layer parameters. The MAC layer and/or PHY layer parameter values may be selected and applied uniformly to each of the NSS spatial streams, or the MAC layer and/or PHY layer parameter values may be selected adaptively.

The cross layer partitioner block 228 may also communicate to the parameter control block 230 to use, for example, quadrature phase shift keying (QPSK) RF modulation rather than 16-quadrature amplitude modulation (16 QAM) RF modulation for the high priority data Output1. The QPSK RF modulation may have a smaller data throughput than the 16 QAM RF modulation, however, the QPSK RF modulation may be more reliable for a given transmission environment. Additionally, the transmit antenna 232a may exhibit more reliable transmission characteristics than the transit antenna 232b. If the transmission environment changes such that the transmit antenna 232b exhibits a more reliable transmission characteristics than the transmit antenna 232a, then the cross layer partitioner block 228 may indicate that the higher priority data be output as Outputn.

The cross layer partitioner block 228 may also take in to account feedback information from the receiving device when selecting MAC layer and/or PHY layer parameter values. The feedback information may also be utilized at the transmit block 215 when performing beamforming on the plurality of NSS spatial streams. In various embodiments of the invention, the cross layer partitioner block 228 may also utilize feedback information from a receiver 284, which is collocated with the transmitter 286 in a transceiver 274. The feedback information from a receiver, may be communicated from the receiver to a collocated transmit block 215. For example, the processor 210 may process the feedback data from a co-located receiver, and communicate the processed feedback information to the transmit block 215. The information may be used, for example, to control the operations on the data streams by the PHY/MAC block 226.

U.S. application Ser. No. 11/327,690 filed Jan. 6, 2006, provides a detailed description of feedback in a MIMO system, which is hereby incorporated herein by reference in its entirety.

Figure 3:
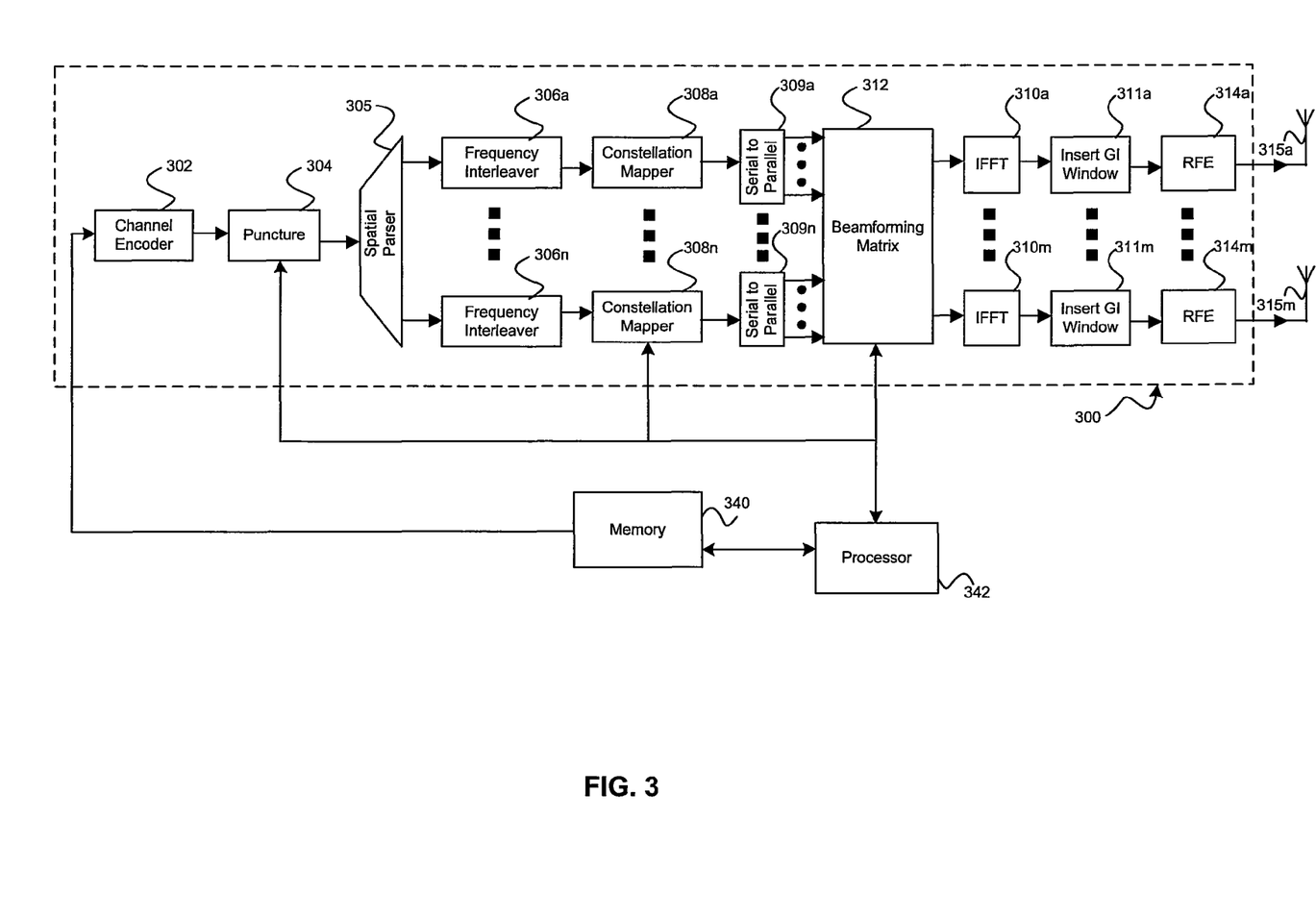
FIG. 3 is a block diagram of an exemplary MIMO transmitter system for MAC layer rate selection, in accordance with an embodiment of the invention.

FIG. 3 is a block diagram of an exemplary MIMO transmitter system for MAC layer rate selection, in accordance with an embodiment of the invention. Referring to FIG. 3, there is shown a transmitter 300, a processor 342, a memory 340, and a plurality of transmitting antennas 315a, . . . , 315m. The transmitter 300 may comprise a channel encoder block 302, a puncture block 304, spatial parser block 305, a plurality of frequency interleaver blocks 306a, . . . , 306n, a plurality of constellation mapper blocks 308a, . . . , 308n, a plurality of serial to parallel converter blocks 309a, . . . , 309n, a beam-forming matrix block 312, a plurality of inverse fast Fourier transform (IFFT) blocks 310a, . . . , 310m, a plurality of insert guard interval (GI) window blocks 311a, . . . , 311m, and a plurality of radio front end (RFE) blocks 314a, . . . , 314m.

The channel encoder block 302 may comprise suitable logic, circuitry, and/or code that may enable transformation of received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate, R, may be specified using the notation $i_b/t_b$, where $t_b$ represents the total number of bits that comprise a coding group of bits, while $i_b$ represents the number of information bits that are contained in the group of bits $t_b$. Any number of bits $t_b - i_b$ may represent redundant bits that may enable the receiver 284 to detect and correct errors introduced during transmission of information from a transmitter 286 to a receiver 284 via a wireless communication medium, for example. Increasing the number of redundant bits may enable greater capabilities at the receiver to detect and correct errors in received information bits. Increasing the number of redundant bits may increase the value of $t_b$ without increasing the number of information bits $i_b$, and correspondingly reduce the coding rate, R. The resulting lower coding rate, R, may be referred to as a "stronger" coding rate in comparison to a higher coding rate, R. The stronger coding rate may also correspond to a stronger error protection scheme. The stronger error protection scheme may correspondingly enable greater capabilities at the receiver to detect and correct errors in received information bits. Decreasing the number of redundant bits may decrease the value of $t_b$ without decreasing the number of information bits $i_b$, and correspondingly increase the coding rate, R. The resulting higher coding rate, R, may be referred to as a "weaker" coding rate in comparison to a lower coding rate, R.

The invention is not limited to BCC, and any one of a plurality of coding techniques, for example, Turbo coding, low density parity check (LDPC) coding, or various block coding techniques such as Reed-Solomon FEC may also be utilized.

The puncture block 304 may comprise suitable logic, circuitry, and/or code that may enable alteration of a coding rate for received encoded data by removing redundant bits from the received transformed binary input data blocks. For example, for each contiguous block of 4 bits of received data that is encoded based on an R=½ coding rate BCC, the received data may comprise 2 information bits, and 2 redundant bits. By removing 1 of the redundant bits in the group of 4 received bits, the puncture block 304 may alter the coding rate from R=½ to R=⅔, for example.

The spatial parser block 305 may comprise suitable logic, circuitry, and/or code that may enable a block of data bits associated with a single bit stream to be divided into a plurality of parsed blocks of data bits, each of which may be associated with a corresponding plurality of parsed bit streams. The single bit stream may comprise data retrieved from the memory 222. Each of the parsed bit streams may be referred to as a spatial stream. A spatial stream may comprise an identifiable block of bits that may be processed within a MIMO system.

The spatial parser block 305 may receive the block of data bits associated with the single bit stream, $b_{db}$, and generate a plurality of parsed bit streams, $b_{st}[i]$, where i may be an index identifying a specific parsed bit stream among the plurality of parsed bit streams. The range of values for the index i may be represented as follows:

$$0 \leq i \leq N_{SS}-1 \quad \text{equation[1]}$$

where $N_{SS}$ may represent a number of spatial streams, for example $N_{SS}=2$ may indicate a MIMO system that comprises 2 spatial streams.

Each of the parsed bit streams, $b_{st}[i]$, may comprise a portion of the bits contained in the single bit stream $b_{db}$. The single bit stream $b_{db}$ may comprise the plurality of bits collectively contained in the corresponding plurality of parsed bit streams $b_{st}[i]$.

Various embodiments of the invention may not be limited to a specific method for allocating bits from a single bit stream to a plurality of spatial streams. For example, given a block of $N_{TOT}$ bits received in a from a single bit stream, the spatial parser block 305 may assign about $N_{TOT}/N_{SS}$ bits to each of the plurality of $N_{SS}$ spatial streams. A first block of $N_{TOT}/N_{SS}$ bits from the bit stream $b_{db}$ may be assigned to spatial stream 1, a second block of $N_{TOT}/N_{SS}$ bits may be assigned to spatial stream 2, and an $N_{SS}^{th}$ block of $N_{TOT}/N_{SS}$ bits may be assigned to spatial stream $N_{SS}$, for example. Alternatively, a $k^{th}$ bit from the bit stream $b_{db}$, where k may represent an index for a bit in the block of data bits associated with the bit stream $b_{db}$, may be assigned to spatial stream i as indicated in the following equation, for example:

$$k_i = \text{floor}(k/N_{SS}) + k \bmod(N_{SS}) \quad \text{equation[2]}$$

where $k_i$ may represent an index for a bit assigned to the $i^{th}$ spatial stream, floor(x) may represent an integer value that is not larger than the value x, and y mod(x) may represent the modulus x value for y.

The frequency interleaver block 306a may comprise suitable logic, circuitry, and/or code that may enable a rearrangement of an order of bits among a block of bits associated with a received spatial stream. The frequency interleaver block 306a may utilize a plurality of permutations when rearranging the order of bits among a block of bits associated with a received spatial stream. After rearrangement, the interleaved block of bits associated with the $i^{th}$ spatial stream, $b_{st}[i]^{int}$, may be divided into a plurality of sub-blocks, $b_{sub}[f]$, where the index f may represent a frequency. The frequency may correspond to one of a plurality of frequency carriers that may be utilized to transmit a representation of the bits contained in the sub-block via a wireless communication medium, for example. The representation of the bits may be referred to as a symbol. Each sub-block, $b_{sub}[f]$, may comprise a portion of bits in the block $b_{st}[i]^{int}$. The block of bits $b_{st}[i]^{int}$ may comprise the plurality of bits collectively contained in the corresponding plurality of sub-blocks $b_{sub}[f]$.

The frequency interleaver block 306n may comprise suitable logic, circuitry, and/or code that may enable a rearrangement of an order of bits among a block of bits associated with a received spatial stream, substantially as described for the frequency interleaver block 306a. In various embodiments of the invention, the number of frequency interleaver blocks 306a ... 306n may equal the number of spatial streams, $N_{SS}$, for example.

The constellation mapper block 308a may comprise suitable logic, circuitry, and/or code that may enable a mapping of received bits, associated with a spatial stream, to one or more symbols. The received bits may be encoded based on an FEC, for example, and may be referred to as coded bits. The constellation mapper block 308a may receive one or more coded bits, $b_{sym}[f]$, and generate the symbol, sym[f], based on a modulation type associated with the spatial stream. The number of coded bits associated with $b_{sym}[f]$ may be determined based on the modulation type. The representation of the symbol, sym[f], may be a complex quantity comprising in-phase (I) and quadrature (Q) components. Each symbol, sym[$f_k$], associated with the one or more coded bits $b_{sym}[f_k]$ may be associated with a frequency carrier, $f_k$, where k may be an index that identifies a frequency associated with a $k^{th}$ frequency carrier, utilized for transmitting a representation of the symbol via the wireless communication medium.

Exemplary modulation types may comprise binary phase shift keying (BPSK), Quadra phase shift keying (QPSK), 16 level QAM (16 QAM), 64 level QAM (64 QAM), and 256 level QAM (256 QAM). For the BPSK modulation type, the number of coded bits associated with a symbol may be represented: num($b_{sym}[f_k]$)=1, for each frequency carrier $f_k$. For the QPSK modulation type, the number of coded bits associated with a symbol may be represented: num($b_{sym}[f_k]$)=2, for each frequency carrier $f_k$. For the 16 QAM modulation type, the number of coded bits associated with a symbol may be represented: num($b_{sym}[f_k]$)=4, for each frequency carrier $f_k$. For the 64 QAM modulation type, the number of coded bits associated with a symbol may be represented: num($b_{sym}[f_k]$)=6, for each frequency carrier $f_k$. For the 256 QAM modulation type, the number of coded bits associated with a symbol may be represented: num($b_{sym}[f_k]$)=8, for each frequency carrier $f_k$.

The spatial stream may comprise a plurality of frequency carriers, $N_{SD}$, for example a 20 MHz RF channel may comprise $N_{SD}=56$ frequency carriers, $f_{-28}, f_{-27}, \ldots, f_{-1}, f_1, \ldots, f_{27}$, and $f_{28}$, that may be utilized for transmitting coded bits, while a 40 MHz RF channel may comprise $N_{SD}=112$ frequency carriers, $f_{-56}, f_{-55}, \ldots, f_{-1}, f_1, \ldots, f_{55}$, and $f_{56}$, that may be utilized for transmitting coded bits. In a MIMO system, the symbols sym[$f_{-28}$], sym[$f_{-27}$], ..., sym[$f_{-1}$], sym[$f_1$], ..., sym[$f_{27}$], and sym[$f_{28}$], or sym[$f_{-56}$], sym[$f_{-55}$], ..., sym[$f_{-1}$], sym[$f_1$], ..., sym[$f_{55}$], and sym[$f_{56}$], may be collectively referred to as an orthogonal frequency division multiplexing (OFDM) symbol. The number of coded bits associated with an OFDM symbol, $N_{CBPS}=N_{SD}*b_{sym}[f_k]$. The number of data bits associated with the OFDM symbol, $N_{DBPS}=R*N_{SD}*b_{sym}[f_k]$, where R may refer to the coding rate.

The constellation mapper block 308n may comprise suitable logic, circuitry, and/or code that may enable a mapping of received bits, associated with a spatial stream, to one or more symbols, substantially as described for the constellation mapper block 308a. In various embodiments of the invention, the number of constellation mapper blocks 308a ... 308n may equal the number of spatial streams, $N_{SS}$, for example.

The serial to parallel block 309a may comprise suitable logic, circuitry, and/or code that may enable serial reception of a plurality of bits, and subsequent simultaneous output of the serially received plurality of bits. The serial to parallel block 309a may comprise suitable memory, latches, and/or registers to enable the serial to parallel function.

The serial to parallel block 309n may comprise suitable logic, circuitry, and/or code that may enable serial reception of a plurality of bits, and subsequent simultaneous output of the serially received plurality of bits, substantially as described for the serial to parallel block 309a. In various embodiments of the invention, the number of serial to parallel blocks 309a . . . 309n may equal the number of spatial streams, $N_{SS}$, for example.

The beamforming matrix block 312 may comprise suitable logic, circuitry, and/or code that may enable processing of a received plurality of spatial streams, and generation of a corresponding plurality of signals that may be simultaneously transmitted by a MIMO transmitter 202. Each of the generated corresponding plurality of signals may comprise at least one weighted sum of at least a portion of the received plurality of spatial streams. A weighted sum may be computed corresponding to each of the plurality of frequency carriers, $f_k$. Each of the signals generated from each weighted sum may be represented as $X[f_k]$. The beamforming matrix block 312 may generate the corresponding plurality of signals based on a channel estimate matrix. The channel estimate matrix may be based on a characterization of a wireless communication medium that estimates channel fading. The channel estimate matrix may be computed based on feedback information from a receiver, in a closed loop system for example, or based on information computed from signals received by a receiver 284 that is collocated with a transmitter 286.

The IFFT block 310a may comprise suitable logic, circuitry, and/or code that may enable conversion of a frequency domain representation of a signal X[f] to a time domain representation X(t). The corresponding time domain signal may comprise a plurality of OFDM symbols. An OFDM symbol may be computed based on application of an IFFT algorithm to the frequency components associated with the corresponding signal X[f]. For example a 64-point IFFT algorithm may be utilized by the IFFT block 310a when processing a 20 MHz RF channel, while a 128-point IFFT algorithm may be utilized when processing a 40 MHz RF channel. An exemplary method for OFDM symbol computation may be found in clause 17.3.5.9 from the IEEE standard 802.11a-1999 (R 2003).

The time domain representation X(t) may comprise time domain representations for a plurality of signals, $x_j(t)$, that may be transmitted simultaneously by a MIMO transmitter 202 as shown in the following equation:

$$X(t) = \begin{bmatrix} x_0(t) \\ x_1(t) \\ \vdots \\ x_{N_{Tx}-1}(t) \end{bmatrix} \qquad \text{equation [3]}$$

Each of the plurality of signals $x_j(t)$ may comprise a plurality of OFDM symbols associated with a $j^{th}$ signal among a plurality of $N_{TX}$ simultaneously transmitted signals from the MIMO transmitter 300. The OFDM symbols transmitted within the $j^{th}$ signal, $x_j(t)$, among a plurality of $N_{TX}$ simultaneously transmitted signals may be transmitted serially in time. Each OFDM symbol may span a time duration, $T_{SYM}$, referred to as a symbol interval, for example $T_{SYM}=4$ μs.

The IFFT block 310m may comprise suitable logic, circuitry, and/or code that may enable conversion of a frequency domain representation of a signal X[f] to a time domain representation X(t), substantially as described for the IFFT block 310a. In various embodiments of the invention, the number of IFFT blocks 310a . . . 310m may equal the number of generated signals $N_{TX}$, for example.

The insert GI window block 311a may comprise suitable logic, circuitry, and/or code that may enable insertion of guard intervals in one of a plurality of signals $x_j(t)$ transmitted by the MIMO transmitter 300. The guard interval, $T_{GI}$, may represent a time interval between the end of a current OFDM symbol interval, and the beginning of a subsequent OFDM symbol interval. Subsequent to the end of a symbol interval associated with a current OFDM symbol may follow a guard interval time duration, $T_{GI}$, for example $T_{GI}=0.8$ μs. Following the guard interval time duration a subsequent symbol interval corresponding to a subsequent OFDM symbol may follow.

The insert GI window block 311m may comprise suitable logic, circuitry, and/or code that may enable insertion of guard intervals in one of a plurality of signals $x_j(t)$ transmitted by the MIMO transmitter 300, substantially as described for the insert GI window block 311a. In various embodiments of the invention, the number of insert GI window blocks 311a . . . 311m may equal the number of generated signals, $N_{TX}$, for example.

The RFE block 314a may comprise suitable, logic, circuitry, and/or code that may enable generation of an RF signal from a received generated signal. The RF block 314a may receive a generated baseband signal. The RFE block 314a may generate the RF signal by utilizing a plurality of frequency carrier signals to modulate the received baseband signal. The modulated signal may be transmitted via the antenna 315a. The RFE block 314a may enable generation of a 20 MHz RF signal, or of a 40 MHz RF signal, for example.

The RFE block 314m may comprise suitable, logic, circuitry, and/or code that may enable generation of an RF signal from a received generated signal, substantially as described for the RFE block 314a. The modulated signal generated by the RFE block 314m may be transmitted via the antenna 315m. In various embodiments of the invention, the number of RFE blocks 314a . . . 314m may equal the number of generated signals, $N_{TX}$, for example.

The processor 342 may comprise suitable logic, circuitry, and/or code that may enable the transmitter 300 to perform transmitter functions in accordance with applicable communications standards. These functions may comprise, but are not limited to, tasks performed at lower layers, for example physical layer (PHY) and medium access control (MAC) layer functions, in a relevant protocol reference model. These tasks may comprise physical layer functions, such as physical layer convergence protocol (PLCP), physical medium dependent (PMD), and/or associated layer management functions, for example. The processor 342 may also enable generation of source information bits and/or retrieval of stored source information that may be subsequently coded, mapped, and transmitted via the wireless medium, for example. The processor 342 may also enable computation of values corresponding to beamforming factors that may be utilized within the beamforming matrix 312 for computing signals $X[f_k]$.

The memory 340 may comprise suitable logic, circuitry, and/or code that may enable storage and/or retrieval of information and/or a representation of the information, for example a binary representation comprising bits. The memory 340 may enable storage of source information bits. The stored source information bits may be assigned physical resources within the memory 340 for the storage. The stored source information bits may be subsequently available for retrieval. Retrieved source information bits may be output by the memory 340 and communicated to other devices, components, and/or subsystems that may be communicatively coupled, directly and/or indirectly, to the memory 340. The memory 340 may enable the stored source information bits to remain stored and/or available for subsequent retrieval until the resources allocated for the storage are deallocated. Physical resources may be deallocated based on a received instruction that the stored source information bits be erased from the memory 340, or based on a received instruction that the physical resources be allocated for the storage of subsequent binary information. The memory 340 may utilize a plurality of storage medium technologies such as volatile memory, for example random access memory (RAM), and/or nonvolatile memory, for example electrically erasable programmable read only memory (EEPROM).

In operation the processor 342 may enable the communication of instructions to the memory 340. The instructions may enable the retrieval of stored multimedia information from the memory 340. The multimedia information may comprise voice, video, and/or data information. The processor 342 may also receive input that specifies a data transfer rate that may be utilized for transmitting the multimedia information.

In one exemplary embodiment of the invention, the retrieved multimedia information may comprise MPEG-1, or MPEG-2 encoded video information. The MPEG video information may be transmitted under real time constraints. Thus, the processor 342 may configure MAC layer and/or PHY layer parameter values based on content type. For example, the processor 342 may set a value for the contention window parameter such that no MAC layer frame retransmission attempts occur when an acknowledgement is not received in response to a previously transmitted MAC frame. The processor 342 may configure the transmitter 300 utilizing transmitter diversity to ensure that computed BER, FER, and/or PER values are within a corresponding target range. In a MIMO communication system utilizing transmitter diversity, the number of spatial streams, $N_{SS}$, may be less than the number of transmitting antennas, $N_{TX}$. The processor 342 may configure the beamforming matrix 312 based on computed channel estimates, and on the values $N_{SS}$ and $N_{TX}$. The value $N_{TX}$ may be determined based on an antenna selection procedure. The data rate for signals transmitted by the transmitter 300 may be less than or equal to the specified data transfer rate. In a transmitter 300 that utilizes a single transmitting antenna, $N_{TX}=1$, the data rate may refer to the data rate for the signal transmitted by the single transmitting antenna. In a transmitter 300 that utilizes a plurality of transmitting antennas, $N_{TX}>1$, the data rate may refer to the aggregate data rate for the individual signals transmitted by each of the plurality of transmitting antennas.

Correspondingly, the processor 342 may enable selection of PHY layer parameter values. The processor 342 may select a coding rate that is utilized by the puncture block 304 for coding each of the $N_{SS}$ spatial streams. Alternatively, the processor 342 may configure the puncture block 304 to utilize adaptive coding such that a coding rate is selected and utilized for each spatial stream and a coding rate utilized for one spatial stream may be different from a coding rate utilized for another spatial stream.

The processor 342 may select a modulation type that is utilized by each of the constellation mapper blocks 308a, . . . , 308n. Alternatively, the processor may adaptively select modulation types for each of the constellation mapper blocks 308a, . . . , 308n such that a modulation type utilized for one spatial streams may be different from a modulation type utilized for another spatial stream.

The one or more coding rates and/or one or more modulation types may be selected based on computed values of BER, FER, and/or PER such that the computed value are within a corresponding target value range, and that the data rate for signals transmitted by the transmitter 300 is less than or equal to the specified data transfer rate.

The retrieved multimedia information may be communicated by the memory 340 to the channel encoder block 302. The retrieved multimedia information may be communicated to the channel encoder block 302 as one or more binary input data blocks. Individual data blocks may be presented as input to the channel encoder blocks serially at distinct time instants. Each data block may comprise a plurality of bits.

The spatial parser block 305 may parse the coded data block to generate a plurality of parsed data blocks. A parsed data block among the plurality of parsed data blocks may comprise at least a portion of the bits contained in the coded data block. Each of the parsed data blocks generated from a coded data block may comprise spatial stream data that may be associated with a corresponding spatial stream. Each of the parsed data blocks may be associated with one of a plurality of spatial streams.

Any of the plurality of frequency interleaver blocks 306a . . . 306n may rearrange the order of bits in a received parsed data block for the corresponding spatial stream. Each of the frequency interleaver blocks 306a . . . 306n may generate an interleaved spatial stream block.

Any of the plurality of constellation mapper blocks 308a . . . 308n may map at least a portion of bits contained in a received interleaved spatial stream block to generate a symbol. Each of the constellation mapper blocks 308a . . . 308n may perform its respective mapping operation by utilizing a modulation type.

Any of the plurality of serial to parallel blocks 309a . . . 309n may convert a bit serial representation of the symbol, generated in the corresponding spatial stream, to a bit parallel symbol representation comprising a plurality of simultaneously output bits. Relating FIG. 2 to FIG. 3, the plurality of bit parallel symbol representations generated by the corresponding plurality of serial to parallel blocks 309a . . . 309n may correspond to the plurality of source signals 206, 208, and 210, as represented in equation [1c].

The beamforming matrix 312 may perform beamforming to generate a plurality of transmit signals based on the received plurality of bit parallel symbols. The processor 342 may determine values for individual beamforming factors for each of the frequency carriers associated with an RF channel.

Any among the plurality of IFFT blocks 310a . . . 310m may convert a frequency domain representation signal, generated for a corresponding transmit signal, to a corresponding time domain representation. Any of the plurality of insert GI window blocks 311a . . . 311m may insert guard intervals in a corresponding transmit signal. Any of the plurality of RFE blocks 314a . . . 314m may generate an RF signal, for a corresponding transmit signal, which may be transmitted via a wireless communications medium via a corresponding one of the plurality of transmitting antennas 315a . . . 315m.

Figure 4:
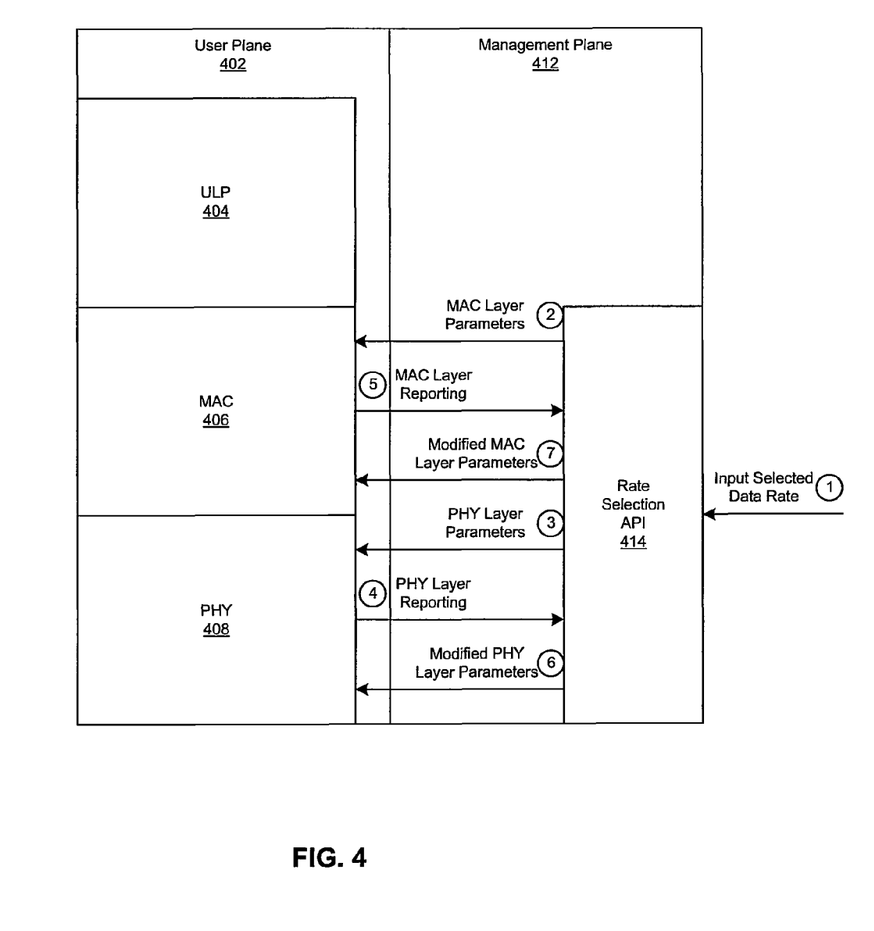
FIG. 4 is an exemplary protocol reference model illustrating protocol interactions for MAC layer rate selection, in accordance with an embodiment of the invention.

FIG. 4 is an exemplary protocol reference model illustrating protocol interactions for MAC layer rate selection, in accordance with an embodiment of the invention. Referring to FIG. 4, there is shown a user plane 402, and a management plane 412. The user plane 402 may comprise an upper layer protocol (ULP) 404, a MAC layer 406, and a PHY layer 408. The management plane 412 may comprise a rate selection application programming interface (API) 414.

Various embodiments of the invention may comprise a rate selection API 412, which receives as input a selected data rate, as illustrated by the reference number 1. The rate selection API 412 may comprise code that perform functions associated with the management plane in a protocol reference model (PRM), such as specified by the International Organization for Standardization (ISO). These functions may comprise setting values to control the operation of protocols in the user plane 402, receiving of notification events from protocols within the user plane 402, and sending responses to one or more protocols within the user plane 402. For example, a notification received by a MAC layer protocol 406 within the user plane 402 may cause the management plane to send a response to the MAC layer protocol 406, the PHY layer protocol 408, and/or the ULP 404. Based on the selected data rate, the rate selection API 414 may select MAC layer parameter values, which may be communicated to the MAC layer 406, as illustrated by the reference number 2. The rate selection API 414 may also select PHY layer parameter values, which may be communicated to the PHY layer 408, as illustrated by the reference number 3. The PHY layer parameter values and/or MAC layer parameter values may be selected such that the transmitted data rate for the transmitter 300 is less than or equal to the selected data rate.

Based on transmitted bits, frames, and/or packets, BER, FER and/or PER statistics may be computed by the processor 342. The BER statistics may be associated with the PHY layer 408, and the FER statistics may be associated with the MAC layer 406, for example. The computed BER statistics may be compared with a corresponding BER target range. Based on the comparison, the PHY layer 408 may communicate PHY layer reporting to the rate selection API 414, as illustrated by the reference number 4. The computed FER statistics may be compared with a corresponding FER target range. Based on the comparison, the MAC layer 406 may communicate MAC layer reporting to the rate selection API 414, as illustrated by the reference number 5.

Based on the PHY layer reporting, and the MAC layer reporting, the rate selection API 414 may communicate modified PHY layer parameter values to the PHY layer 408, and/or modified MAC layer parameter values to the MAC layer 406, when the computed BER and or FER statistics are not within a corresponding target range, as illustrated by reference numbers 6 and 7, respectively. The modified PHY layer parameter values and/or modified MAC layer parameter values may be selected such that the transmitted data rate for the transmitter 300 is less than or equal to the selected data rate.

Figure 5:
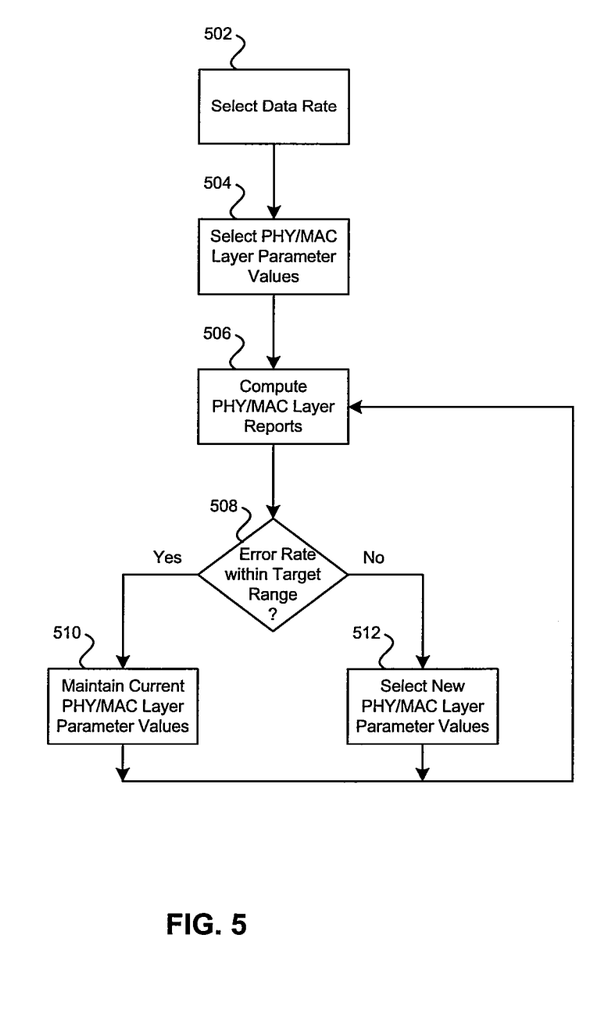
FIG. 5 is a flowchart illustrating exemplary steps for MAC layer rate selection, in accordance with an embodiment of the invention.

FIG. 5 is a flowchart illustrating exemplary steps for MAC layer rate selection, in accordance with an embodiment of the invention. Referring to FIG. 5, in step 502, a data rate may be selected. A user of a mobile communication device may select the data rate, for example. In step 504, PHY layer parameter values, and/or MAC layer parameter values, may be selected based on the selected data rate. A processor 342 may enable selection of the PHY layer parameter values, and/or MAC layer parameter values. The selected PHY layer parameter values, and/or MAC layer parameter values may be utilized to configure the transmitter 300. In step 506, the processor 342 may compute PHY layer reports, and/or MAC layer reports. In step 508, the processor 342 may determine whether computed BER, FER, and/or PER values are within corresponding target ranges. If the computed BER, FER, and/or PER values are each within the corresponding target ranges, in step 510, current PHY layer parameter values, and/or MAC layer parameter values, may be maintained. However, if the computed BER, FER, and/or PER values are not each within the corresponding target ranges, in step 512, new PHY layer parameter values, and/or new MAC layer parameter values, may be selected. The transmitter 300 may be configured based on the new PHY layer parameter values, and/or MAC layer parameter values. Step 506 may follow either step 510 or step 512.

Various embodiments of the invention may comprise a rate selection algorithm in which a data transfer rate may be selected to achieve a target BER. In one exemplary embodiment of the invention, a maximum data transfer rate may be selected by a user. A transmitter 300 may utilize an initial set of PHY layer parameter values, and/or MAC layer parameter values based on the selected data transfer rate when transmitting data. The transmitter 300 may subsequently decrease the data transfer rate when a BER calculated for the transmitted data is less than the target BER. The transmitter 300 may compute a subsequent set of PHY layer parameter values, and/or MAC layer parameter values based on the decreased data transfer rate.

In another exemplary embodiment of the invention, the target BER may be determined based on a upper layer protocol (ULP). For example, a first target BER value may be utilized when the ULP is TCP, while a second target BER value may be utilized when the ULP is UDP. In other exemplary embodiments of the invention, the PHY layer parameter values, and/or MAC layer parameter values may be selected based on a content type for the transmitted data, for example, digital video content.

Aspects of a system for medium access control (MAC) rate selection may include at least one processor 342 that enables selection of MAC layer parameter values and/or PHY layer parameter values, to maintain a rate of data transmission of at least one transmitted signal, which is no greater than a selected data transfer rate. The error rate of the one or more transmitted signals may be maintained within a specified range based on the selection for varying signal to noise (SNR) ratios. The error rate may be a bit error rate, a frame error rate, and/or a packet error rate.

The one or more processors 342 may enable calculation of at least one computed error rate based on the transmitted signals. The computed error rate may be compared with the specified range for the error rate. MAC layer parameter values and/or PHY layer parameter values may be modified based on the comparison. The PHY layer parameter values may comprise a coding rate, and/or a modulation type. The MAC layer parameters may comprise a contention window value, and/or a determination of a number of transmitting antennas to be utilized for transmitting signals based on at least one spatial stream. An antenna selection procedure may enable determination of the number of transmitting antennas to be utilized for transmitting signals for the one or more spatial streams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling multimedia information in a communication system, the method comprising:
performing by one or more processors and/or circuits integrated within a single chip:
selecting one or both of MAC layer parameter values and/or PHY layer parameter values, to maintain a rate of data transmission of at least one transmitted signal, which is no greater than a selected data transfer rate; and
maintaining, based on said selecting, an error rate of said at least one transmitted signal within a specified range for varying signal to noise ratio (SNR) values.

2. The method according to claim 1, wherein said error rate is one or more of a bit error rate, a frame error rate, and/or a packet error rate.

3. The method according to claim 1, comprising calculating at least one computed error rate based on said at least one transmitted signal.

4. The method according to claim 3, comprising comparing said at least one computed error rate with said error rate.

5. The method according to claim 4, comprising modifying a value for said selected one or both of said MAC layer parameter values and/or said PHY layer parameter values, based on said comparing.

6. The method according to claim 1, wherein said PHY layer parameter values comprise one or both of a coding rate and/or a modulation type.

7. The method according to claim 1, wherein said MAC layer parameters comprise one or both of a contention window value and/or a determination of a number of transmitting antennas to be utilized for transmitting signals based on at least one spatial stream.

8. The method according to claim 7, comprising performing an antenna selection procedure for said determination of said number of transmitting antennas to be utilized for transmitting signals for said given number of spatial streams.

9. A non-transitory computer readable storage medium having stored thereon, a computer program having at least one code section for handling multimedia information in a communication system, the at least one code section being executable by a computer for causing the computer to perform steps comprising:
selecting one or both of MAC layer parameter values and/or PHY layer parameter values, to maintain a rate of data transmission of at least one transmitted signal, which is no greater than a selected data transfer rate; and
maintaining, based on said selecting, an error rate of said at least one transmitted signal within a specified range for varying signal to noise ratio (SNR) values.

10. The non-transitory computer readable storage medium according to claim 9, wherein said error rate is one or more of a bit error rate, a frame error rate, and/or a packet error rate.

11. The non-transitory computer readable storage medium according to claim 9, comprising code for calculating at least one computed error rate based on said at least one transmitted signal.

12. The non-transitory computer readable storage medium according to claim 11, comprising code for comparing said at least one computed error rate with said error rate.

13. The non-transitory computer readable storage medium according to claim 12, comprising code for modifying a value for said selected one or both of said MAC layer parameter values and/or said PHY layer parameter values, based on said comparing.

14. The non-transitory computer readable storage medium according to claim 9, wherein said PHY layer parameter values comprise one or more of a coding rate and/or a modulation type.

15. The non-transitory computer readable storage medium according to claim 9, wherein said MAC layer parameters comprise one or both of a contention window value and/or a determination of a number of transmitting antennas to be utilized for transmitting signals based on at least one spatial stream.

16. The non-transitory computer readable storage medium according to claim 15, comprising code for performing an antenna selection procedure for said determination of said number of transmitting antennas to be utilized for transmitting signals for said at least one spatial stream.

17. A system for handling multimedia information in a communication system, the system comprising:
at least one processor that enables selection of one or both of MAC layer parameter values and/or PHY layer parameter values, to maintain a rate of data transmission of at least one transmitted signal, which is no greater than a selected data transfer rate; and
said at least one processor enables maintenance of an error rate of said at least one transmitted signal within a specified range, based on said selection, for varying signal to noise ratio (SNR) values.

18. The system according to claim 17, wherein said error rate is one or more of a bit error rate, a frame error rate, and/or a packet error rate.

19. The system according to claim 17, wherein said at least one processor enables calculation of at least one computed error rate based on said at least one transmitted signal.

20. The system according to claim 19, wherein said at least one processor enables comparison of said at least one computed error rate with said error rate.

21. The system according to claim 20, wherein said at least one processor enables modification of a value for said selected one or both of said MAC layer parameter values and said PHY layer parameter values, based on said comparison.

22. The system according to claim 17, wherein said PHY layer parameter values comprise one or both of a coding rate and/or a modulation type.

23. The system according to claim 17, wherein said MAC layer parameters comprise one of both of a contention window value and/or a determination of a number of transmitting antennas to be utilized for transmitting signals based on at least one spatial stream.

24. The system according to claim 23, wherein said at least one processor enables performance of an antenna selection procedure for said determination of said number of transmitting antennas to be utilized for transmitting signals for said at least one spatial stream.

* * * * *